Oct. 14, 1969         B. E. RAGAN         3,472,714
METHOD OF REBUILDING PREVIOUSLY USED TIRES
Filed Oct. 18, 1966
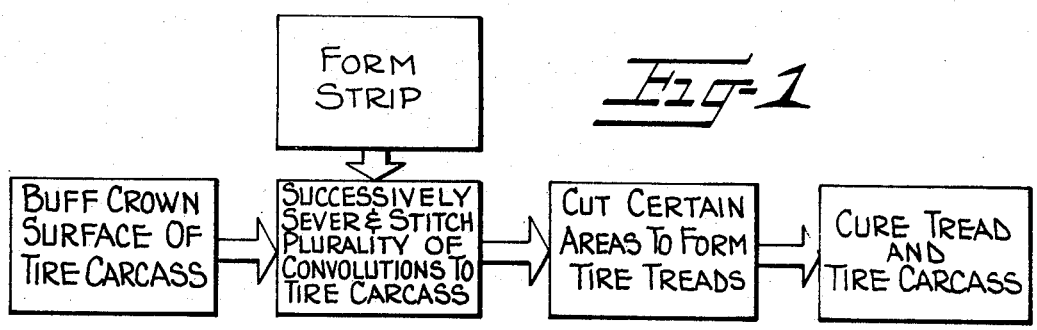
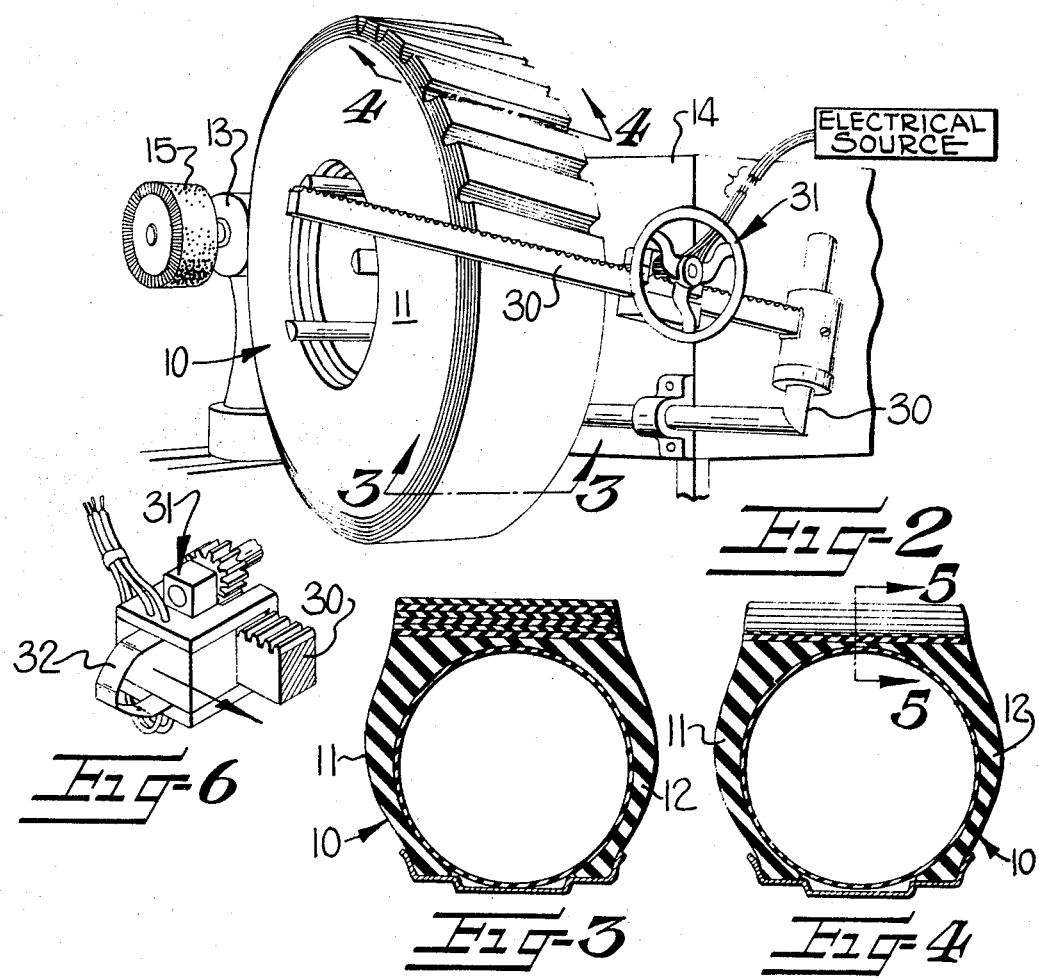
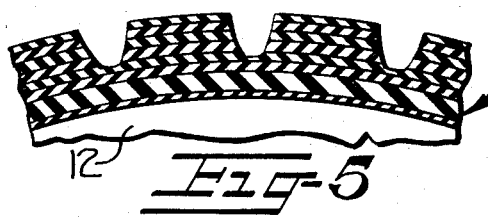
INVENTOR:
BRADLEY E. RAGAN
BY Parrott, Bell, Seltzer, Park + Heard
ATTORNEYS United States Patent Office 3,472,714
Patented Oct. 14, 1969

3,472,714
METHOD OF REBUILDING PREVIOUSLY USED TIRES
Bradley E. Ragan, Spruce Pine, N.C., assignor to Brad Ragan Inc., Spruce Pine, N.C., a corporation of North Carolina
Filed Oct. 18, 1966, Ser. No. 587,599
Int. Cl. B29h 5/04, 17/02
U.S. Cl. 156—96                                    6 Claims

ABSTRACT OF THE DISCLOSURE

A method of rebuilding a lugged tire tread on a previously used heavy-duty penumatic tire carcass in which a plurality of adhered together convolutions of uncured rubber stock are built up about a smoothed peripheral surface of the previously used tire carcass and circumferentially spaced apart, transversely extending portions are thereafter removed from some of the convolutions so as to define on the tire carcass a lugged tread.

---

My invention pertains to a method of building a lugged tire tread and, more particularly, to a method for renewing a large heavy equipment tire for reuse by building a lugged tread thereon.

The tread designs characteristic of large pneumatic tires used with heavy grading equipment, such as size 11.0 x 20 and larger earthmover tires, are intended primarily to provide traction and protection against sideslip for the equipment, through the use of a tread including lugs extending substantially transversely of the crown of the tire yet at an angle sufficient to limit sideslip. Heretofore, such lugged treads for heavy-duty tires generally have been built in accordance with conventional methods as used for tires not having lugged treads. In following such methods, the carcass of a heavy-duty tire is built up with a relatively thick crown of uncured rubber stock and then positioned in an encircling mold which bears an internal lugged tread design, to mold the tread design into the crown portion of the tire while simultaneously vulcanizing the rubber stock. In recapping, the thick crown of uncured rubber stock on the carcass is provided by a preform known in the trade as "camelback," which is manufactured to size for each tire size being renewed.

Significant problems are presented by this method of building treads for large, heavy-duty tires. With such tire sizes, the molds and other equipment used in conjunction with this method are quite expensive, and a large capital investment is required if many sizes included in the wide range of heavy-duty tire sizes are to be accommodated. A retreader, in particular, is faced with further difficulty in that camelback also must be stocked in preforms of the correct size for each of the tire sizes to be retreaded and has only a limited shelf life, thus requiring additional investment in an inventory of perishable goods.

As regards tires not having lugged treads, attempts have heretofore been made at avoiding the capital investment in equipment necessary for retreading large heavy-duty tires through the use of regrooving methods. Thread designs formed by regrooving are similar to conventional automobile tire tread designs and are formed in a smooth crown surface by cutting threads from the rubber stocks. Heretofore, this method has been applied to passenger vehicle tires as an alternative to retreading where a sufficient thickness of rubber remains on the crown surface even after the original tread design has been worn away, and to avoid the necessity of providing tread design molds. As so applied, regrooving has been unsatisfactory and is not now regarded as a safe or satisfactory renewal method.

In an effort to avoid the expense involved in providing such supplies and equipment and involved in following previously used methods for full recapping of heavy-duty lugged tread tires, it has heretofore been proposed to renew such a tire by a method known as relugging. Relugging involves removing a portion of a worn lug to leave a stub having a smooth surface and then securing a length of uncured rubber lug stock to the stub surface. Such a method obviates the use of a curing vessel including a tread mold and reduces the quantity of uncured rubber stock which must be used in renewing the tread, but does not entirely avoid the inventory problem and introduces serious difficulties in obtaining a bond between the cured rubber lug stub and the relugging stock.

Conventionally, uncured rubber such as camelback or relugging stock is secured to the tire carcass being renewed through the use of a thin layer of soft rubber material known as cushion gum. Cushion gum, while necessary to permit obtaining adhesion of the uncured rubber stock to the cured rubber of the tire carcass at a conveniently low temperature, has substantially less tensile strength than either the tire carcass of the renewal stock, both when in the uncured state for application and after curing of the renewed tire. Thus, a tread which has been renewed in accordance with a method relying on the use of cushion gum includes an inherent line of weakness at the join of the cushion gum to the tire carcass. Such a weak join is particularly troublesome in a relugged heavy-duty tire, inasmuch as high stresses are imposed on the lugs and will result in separation of the added lug stock from the original carcass.

With the foregoing deficiencies in mind, it is an object of this invention to provide a method of building a lugged tread on a heavy-duty tire which is particularly valuable in renewing such tires for reuse and through which the necessity of stocking uncured rubber materials in specific sizes and equipping a plant with expensive tire mold equipment is avoided while a stronger and more satisfactory retread is obtained.

A further object of this invention is to provide a method for building a lugged tread for heavy-duty tires wherein uncured rubber stock is supplied in the form of a strip of predetermined dimensions, and is applied to a smooth crown surface of a tire in a plurality of stitched together convolutions. Thereafter, predetermined volumes of the stitched together formed strip are removed to define in the crown of the tire the desired lugged tread configuration. Through the method of this invention wherein stock is formed and then promptly applied to the tire carcass, proper bonding of the uncured rubber stock is obtained, deterioration during the storage of the stock to be used is avoided, and a wide variety of tread designs and tire sizes may be accommodated inasmuch as the tires and built-up treads are simply and easily cured within a steam pressure vessel.

Some of the objects of the invention having been stated, other objects will appear as the description proceeds when taken in connection with the accompanying drawings, in which—

FIGURE 1 is a diagrammatic representation of the steps of the method of this invention;

FIGURE 2 is a perspective view of a tire on which a lugged tread is being built in accordance with the method of this invention, at a certain intermediate step in the method of this invention;

FIGURE 3 is a cross-sectional view of the tire of FIGURE 2, taken substantially along the line 3—3 in FIGURE 2;

FIGURE 4 is a view similar to FIGURE 3, taken substantially along the line 4—4 in FIGURE 2;

FIGURE 5 is an enlarged longitudinal sectional view taken substantially along the line 5—5 in FIGURE 4; and FIGURE 6 is a perspective view of a typical knife blade used in this invention mounted on its traversing means.

Referring now more particularly to the drawing, the building of a lugged tread on a heavy-duty tire in accordance with the method of this invention proceeds step by step generally from left to right of the diagrammatic representation of FIGURE 1. While FIGURE 1 is intended to briefly represent the successive steps undertaken in practicing the method of this invention, it is believed that a better understanding of the method may be obtained by a description given with reference to a tire, such as the tire indicated generally at 10 (FIGURE 2), at one stage in the building thereon of a lugged tread in accordance with the method of this invention.

Conventionally, the tire 10 includes sidewall portions 11, 12 which define the shoulders of the tire and the external crown or tread face of the carcass therebetween (FIGURES 3, 4 and 5). The initial step of my method is to form the crown of the tire 10 to have a smooth surface, which preferably is accomplished by buffing to substantially remove worn tread lugs therefrom. Buffing may be done by mounting the tire 10 on a suitable support 14 (FIGURE 2) for rotation adjacent a buffing wheel 15 driven by a motor 13. Such apparatus is conventional and not critical to practice of my method. It is, however, important that the crown surface be properly prepared for further steps in my method by being clean and free from dirt or grease.

Thereafter, uncured rubber stock is supplied in an indeterminate length, uniform thickness strip, which has a generally rectangular cross-sectional configuration. The cross-sectional configuration of the strip is such that the strip has a width substantially greater than the thickness thereof and substantially equal to the width of the crown surface of the tire 10, as defined between the sidewall portions 11, 12. Preferably, the thickness of the indeterminate length strip is no more than one-half inch, but it may be as thin as may be conveniently formed.

It is contemplated by this invention that the indeterminate length strip be supplied for the tread building operation promptly after the strip has been formed, and that the strip may be formed by either of two suitable rubber working processes. More particularly, the strip may be formed by the use of a calender-type rubber mill, wherein two calender rollers are driven at speeds such that there is a slight differential linear surface speed, to result in working rubber blocks and forming the same into a sheet of uniform thickness. The calendered sheet may be stripped from the calender rollers of the mill in an indeterminate length strip of predetermined width suitable for application to the tire 10. Alternatively, the indeterminate length strip may be extruded from a suitable rubber extruder, such as the extruder which is the subject matter to United States Patent No. 2,958,098. In any event, the formed rubber strip may be wound into a magazine, with subsequent prompt application to the crown surface of the tire 10, preferably while still at an elevated temperature as a result of calendering or extrusion.

Thereafter, an operator successively positions and severs from the indeterminate length of stock strip a plurality of end-joined convolutions encircling the crown surface of the tire 10. As each length of stock is severed from the supply and positioned as an end-joined convolution, the convolution is stitched to the underlying surface, which is either the cured rubber of the tire carcass or the uncured rubber of a preceding convolution.

The importance of the use of end-joined convolutions and of promptness in positioning and stitching successive convolutions lies particularly in obtaining an entirely uniform depth of uncured rubber stock material at all peripheral locations about the tire carcass 10 and in obtaining satisfactory bonding of the uncured rubber stock to the substrate material, regardless of whether the substrate is cured or uncured rubber. It is the direct bonding of uncured rubber stock to the substrate, without the use of cushion gum as an adhesive intermediary layer, which provides the desired high strength in a lugged tread built in accordance with this invention, and it is the uniform distribution of rubber stock through the use of end-joined convolutions which avoids undue stress or the introduction of improperly bonded areas which could result in tread loss.

Subsequent to the positioning and stitching of a sufficient number of successive end-joined convolutions of stock strip to provide a desired depth of uncured rubber stock radially of the tire carcass 10 to form the desired lugged tread pattern, predetermined volumes of the stitched together convolutions of stock strip are removed from the tire carcass to define thereon a lugged tread. More particularly, as apparent from FIGURE 2, generally trapezoidal volumes are taken from some of the stitched together convolutions of stock along predetermined paths directed at predetermined angles generally transversely of the crown surface of the tire carcass 10, to define spaces between the radially outwardly projecting lugs formed by the remaining sector portions of stitched together convolutions of stock. Preferably, the removal of the predetermined volumes of stock is performed by passing a heated knife having a generally trapezoidal outline configuration along predetermined paths relative to the tire carcass, and thereby severing portions of some of the stitched together convolutions while maintaining the innermost convolution unsevered to retain a large bonding area to the tire carcass (FIGURES 4 and 5). While the heated knife apparatus forms no part of the present invention, that apparatus is partially illustrated in FIGURE 2, where an adjustable support member 30 is shown which may be positioned generally transversely of the crown surface of the tire, and which is traversed by a movable support means 31 on which the electrically heated knife 32 is mounted.

Subsequent to the removal of the stock to define on the tire carcass 10 a lugged tread design, the uncured rubber stock is subjected to predetermined temperature conditions for a predetermined length of time in order to vulcanize the rubber stock and complete renewal of the tire 10. Inasmuch as the desired lugged tread design has been formed in the tire carcass prior to vulcanization, it is not necessary to vulcanize the tire 10 within a mold having a lugged tread design surface, but the tire may instead be vulcanized within any large pressure vessel. Thus, the large capital investment which would be involved in providing tread molds for a variety of sizes of tires and a variety of tread designs is entirely obviated.

It is believed apparent that my invention provides both economical advantages and an improved renewed tread as compared with conventional methods wherein camelback is adhesively secured to a tire carcass and thereafter molded into a tread design during vulcanization. The advantages and improvement characteristic of my method are obtained by building successive convolute layers of fresh thin sheet stock, thereby avoiding the necessity of an adhesive layer, and then removing predetermined volumes of the built-up stock to define a tread. The carcass and built-up tread may then be cured without requiring a tread design mold.

I claim:

1. A method of rebuilding a previously used heavy-duty pneumatic tire comprising the steps of:

forming a smooth surface on the periphery of a previously used tire carcass, supplying uncured rubber stock in an indeterminate length, uniform thickness strip having a generally rectangular cross-sectional configuration and predetermined width substantially greater than the thickness thereof and substantially equal to the width of the peripheral surface of the tire carcass, then severing from the stock strip and winding about the smoothed peripheral surface a plurality of convolutions of the uncured rubber stock while stitching and adhering the convolutions together and to the tire carcass, then passing a heated tool through some of the adhered together convolutions and removing therefrom circumferentially spaced apart, transversely extending portions while maintaining the innermost convolution immediately adjacent and directly adhered to the peripheral surface of the tire carcass unsevered so as to define on the tire carcass a lugged tread in which lugs projecting radially outwardly at and extending transversely across the periphery of the rebuilt tire are formed by adhered together sector portions of the convolutions through which the heated tool passed and so as to retain adhesion of the sector portions and innermost convolution to the tire carcass and each other, and then curing the rubber stock by heating the entire rebuilt tire.

2. A method according to claim 1 wherein the step of passing a heated tool through some of the convolutions and removing portions therefrom includes passing a heated knife having a generally trapezoidal outline configuration along predetermined paths relative to the tire carcass and thereby severing generally trapezoidal volumes from the convolutions.

3. A method as claimed in claim 2 wherein the step of forming uncured rubber stock includes milling the stock in a rubber mill and then stripping the stock from the mill as the formed strip.

4. A method as claimed in claim 2 wherein the step of supplying uncured rubber stock includes forming the strip by hot extruding the stock.

5. A method as claimed in claim 2 wherein the step of forming a smooth surface includes buffing the tire carcass to substantially remove worn tread lugs therefrom.

6. A method according to claim 1 wherein the step of winding convolutions while stitching proceeds with the stock strip at an elevated temperature and the step of curing includes uniformly heating the tire within a steam vessel while maintaining the sector portions of the convolutions which define the lugs in an adhered together condition.

References Cited

UNITED STATES PATENTS

| | | | |
|---|---|---|---|
| 2,362,967 | 11/1944 | Bivans | 157—13 |
| 2,474,013 | 6/1949 | Rawls | 156—96 |

FOREIGN PATENTS

| | | |
|---|---|---|
| 123,136 | 2/1919 | Great Britain. |
| 752,352 | 7/1956 | Great Britain. |
| 3,365,592 | 2/1959 | Switzerland. |

HAROLD ANSHER, Primary Examiner

C. B. COSBY, Assistant Examiner

U.S. Cl. X.R.

156—128, 130

UNITED STATES PATENT OFFICE
CERTIFICATE OF CORRECTION

Patent No. 3,472,714          October 14, 1969

Bradley E. Ragan

It is certified that error appears in the above identified patent and that said Letters Patent are hereby corrected as shown below:

Column 3, line 58, "to" should read -- of --. Column 6, line 27, "3,365,592" should read -- 336,592 --.

Signed and sealed this 20th day of October 1970.

(SEAL)
Attest:

Edward M. Fletcher, Jr.
Attesting Officer

WILLIAM E. SCHUYLER, JR.
Commissioner of Patents

REEXAMINATION CERTIFICATE (326th)
United States Patent [19]
Ragan

[11] B1 3,472,714
[45] Certificate Issued Apr. 2, 1985

[54] METHOD OF REBUILDING PREVIOUSLY USED TIRES

[75] Inventor: Bradley E. Ragan, Spruce Pine, N.C.

[73] Assignee: Brad Ragan Inc., Spruce Pine, N.C.

Reexamination Request:
No. 90/000,507, Feb. 22, 1984

Reexamination Certificate for:
Patent No.: 3,472,714
Issued: Oct. 14, 1969
Appl. No.: 587,599
Filed: Oct. 18, 1966

Certificate of Correction issued Oct. 20, 1970.

[51] Int. Cl.³ ............... B29H 17/40; B29H 17/36
[52] U.S. Cl. ........................... 156/96; 156/128.6; 156/130; 156/95; 157/13
[58] Field of Search ............. 156/95, 96, 112, 123, 156/128.1, 128.6, 129, 130, 130.3, 130.5, 134; 425/17, 19; 157/13

[56] References Cited

U.S. PATENT DOCUMENTS

| | | | |
|---|---|---|---|
| 951,872 | 3/1910 | Wirt | 156/96 |
| 1,920,720 | 8/1933 | Thurman et al. | |
| 2,009,599 | 7/1935 | Woock | 156/96 |
| 2,271,855 | 2/1942 | Cleveland et al. | 156/96 |
| 2,362,967 | 11/1944 | Bivans | |
| 2,474,013 | 6/1949 | Rawls | 156/96 |
| 2,958,098 | 11/1960 | Barwell et al. | 425/380 |
| 2,995,183 | 8/1961 | Love | 157/13 |
| 3,177,918 | 4/1965 | Holman | 156/96 |

FOREIGN PATENT DOCUMENTS

| | | | |
|---|---|---|---|
| 1105146 | 4/1961 | Fed. Rep. of Germany | |
| 336592 | 2/1959 | Switzerland | 157/13 |
| 123136 | 2/1919 | United Kingdom | 156/112 |
| 752352 | 7/1956 | United Kingdom | 156/96 |

OTHER PUBLICATIONS

Vitacap Process Manual, American Tire Machinery Company, Manual Nos. 2V, 4V, no date given.
American Tire Machinery Equipment Catalog, no date given.
Firestone Repair Materials Catalog, Effective Feb. 15, 1946, Firestone Tire & Rubber Co., Akron, Ohio.
Firestone Shop Manual, Firestone Tire and Rubber Co., Akron, Ohio, 1944.

*Primary Examiner*—Lois E. Boland

[57] ABSTRACT

A method of rebuilding a lugged tire tread on a previously used heavy-duty pneumatic tire carcass in which a plurality of adhered together convolutions of uncured rubber stock are built up about a smoothed peripheral surface of the previously used tire carcass and circumferentially spaced apart, transversely extending portions are thereafter removed from some of the convolutions so as to define on the tire carcass a lugged tread.

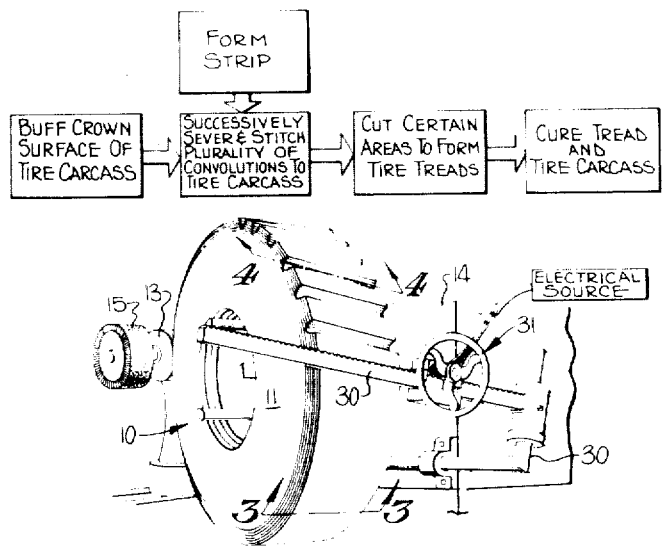

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1-6 is confirmed.

* * * * *